United States Patent [19]
Bersier

[11] 3,837,302
[45] Sept. 24, 1974

[54] INSTALLATION FOR THE INCINERATION OF HOUSEHOLD REFUSE AND INDUSTRIAL WASTE

[75] Inventor: Henri Bersier, Bulle, Switzerland

[73] Assignee: Societe Anonyme Surtec, Bulle, Switzerland

[22] Filed: July 5, 1973

[21] Appl. No.: 376,713

[30] Foreign Application Priority Data
July 11, 1972 Switzerland...................... 10388/72

[52] U.S. Cl. ................................ 110/8 C, 110/8 A
[51] Int. Cl. ............................................ F23g 5/12
[58] Field of Search .......... 110/8 R, 8 A, 8 C, 18 R, 110/18 C

[56] References Cited
UNITED STATES PATENTS

| | | |
|---|---|---|
| 1,995,723 | 3/1935 | Van Denberg........................... 110/8 |
| 3,491,707 | 1/1970 | Bakker..................................... 110/8 |
| 3,504,645 | 4/1970 | Davenport............................... 110/8 |
| 3,548,760 | 12/1970 | Yarnell et al............................ 110/8 |
| 3,651,771 | 3/1972 | Eberle...................................... 110/8 |
| 3,680,500 | 8/1972 | Pryor........................................ 110/8 |
| 3,680,501 | 8/1972 | Szilagyi et al........................... 110/8 |

*Primary Examiner*—Kenneth W. Sprague
*Attorney, Agent, or Firm*—Wenderoth, Lind & Ponack

[57] ABSTRACT

An installation for the incineration of household refuse and industrial waste includes a chamber for the combustion of refuse and waste, this combustion chamber communicating with a chimney for the evacuation of burnt gases via a post-combustion chamber. Both the combustion and post-combustion chambers have inlets for air and for a liquid or gaseous fuel, and a thermostat for maintaining the temperature of combustion in the respective chambers at 800° C.

1 Claim, 3 Drawing Figures

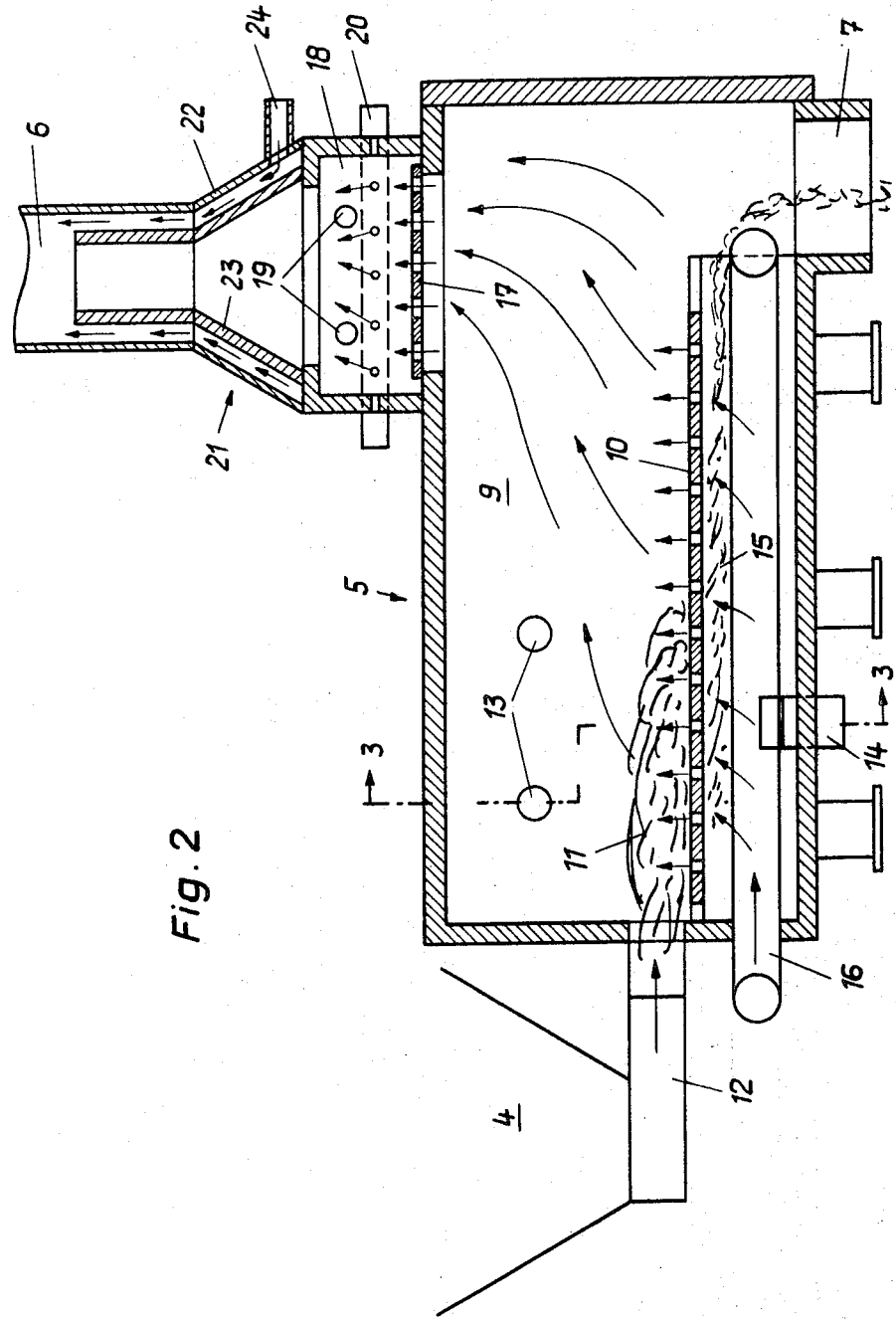

3,837,302

INSTALLATION FOR THE INCINERATION OF HOUSEHOLD REFUSE AND INDUSTRIAL WASTE

BACKGROUND OF THE INVENTION

The invention concerns installation for the incineration of household refuse and industrial waste.

Interest up to present has been directed to powerful incineration installations intended for large urban districts and able to treat a considerable mass of refuse and waste daily. The aim of the invention is to provide a relatively small installation, notably intended for small townships and capable, for example, of treating up to 1.5 tons of refuse per hour.

SUMMARY OF THE INVENTION

According to the invention, an installation for the incineration of household refuse and industrial waste comprises a chamber for the combustion of refuse and waste, such combustion chamber including an air inlet, an inlet for liquid or gaseous fuel, and a thermostat arranged to maintain the temperature of the combustion chamber at at least 800° C, and a post-combustion chamber for gases from the combustion chamber, such post-combustion chamber including an air inlet, an inlet for liquid or gaseous fuel and a thermostat arranged to maintain the temperature of the post-combustion chamber at at least 800° C.

BRIEF DESCRIPTION OF THE DRAWINGS

The accompanying drawings schematically show, by way of example, an embodiment of an installation according to the invention. In the drawings:

FIG. 2 is a cross-section on an enlarged scale of an oven forming part of the installation shown in FIG. 1.

DETAILED DESCRIPTION OF THE INVENTION

Figure 1:
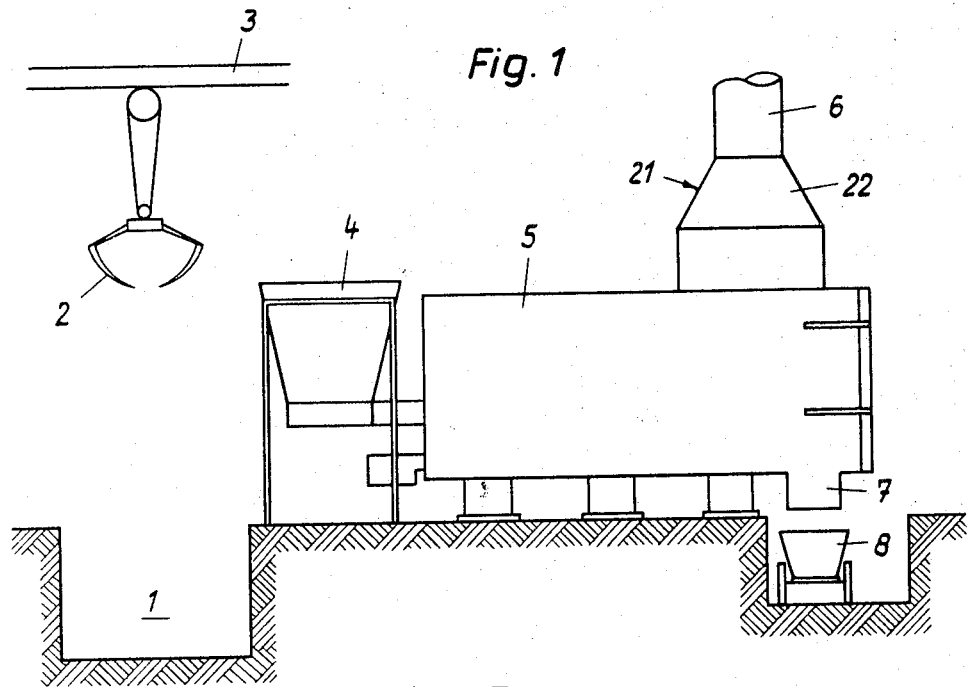
FIG. 1 is an overall diagrammatic view of the installation.

The installation shown in FIG. 1 comprises a pit 1 for receiving refuse and waste to be burnt, and a hydraulic bucket 2 movable along a suspended girder 3 and adapted to pick up refuse and waste in the pit 1 and transfer it to a feed hopper 4 communicating with an inlet of an oven 5. The oven 5 has a metal chimney 6 for removal of burnt gases and an outlet 7 for ashes which drop into a wagon 8.

Figure 3:
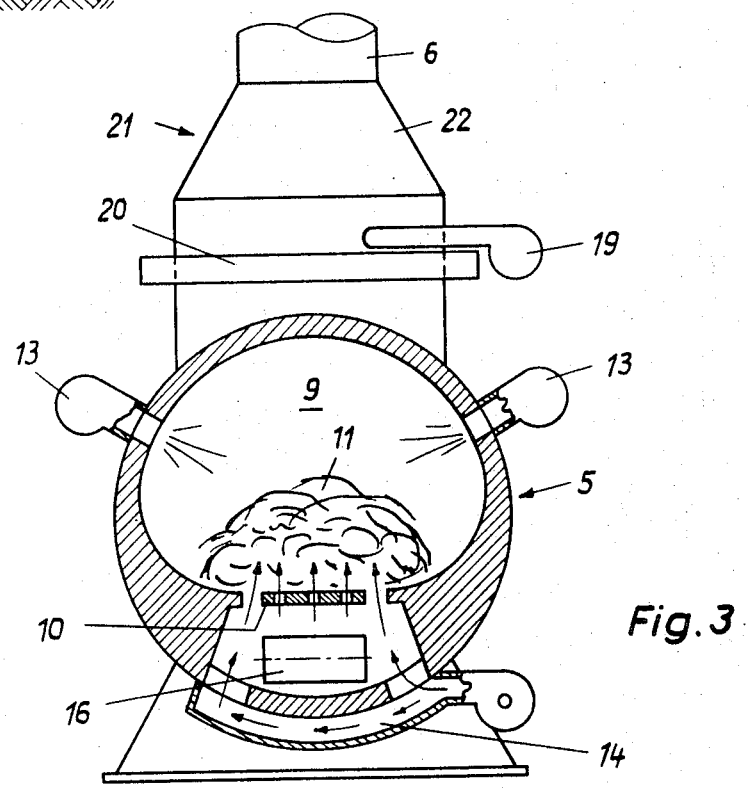
FIG. 3 is a cross-section taken along line 3—3 of FIG. 2.

The oven 5 (FIGS. 2 and 3) includes a combustion chamber 9 provided with a grid 10 on which refuse and waste 11 are fed from the hopper 4 by means of a hydraulic ram 12. The combustion chamber 9 has four burners 13 fed with liquid or gaseous fuel and an inlet 14 (FIG. 2) for the supply of primary combustion air from a blower, not shown. Ashes 15 produced by combustion of the refuse and waste 11 in the chamber 9 fall through the grid 10 onto a conveyor belt 16 which transports them to the outlet 7 of the oven. As shown in FIG. 3, the combustion chamber 9 in the longitudinal direction includes two parts, i.e., an upper substantially elliptically shaped part, and a lower recessed part. Grid 10 separates the two parts, and conveyor 16 is located in the recessed part. A thermostat, not shown, is disposed in the combustion chamber 9 in a manner to maintain the temperature of combustion in this chamber at 800° C.

Incompletely burned gases leaving the combustion chamber 9 pass through a panel of Venturi filters 17 into a post-combustion chamber 18 disposed above the chamber 9 and communicating the latter with chimney 6. Chamber 18 is provided with two burners 19 supplied with liquid or gaseous fuel and an inlet manifold 20 with a plurality of ports for the supply of secondary air from a blower, not shown. The post-combustion chamber 18 also houses a thermostat, not shown, arranged to maintain the temperature of combustion in this chamber at 800° C. The gases in chamber 18 are thus fully burnt and leave by a cooling section 21. The latter comprises a trunco-conical envelope 22 forming the lower part of the chimney 6 and an inner chimney 23 of refractory material, of a similar shape to the lower part of chimney 6 and disposed therein with an air passage therebetween. Cooling air is sent by the secondary air blower between the chimneys 6 and 23 via an inlet 24. The purpose of the cooling section 21 is to rapidly cool the evacuated gases, so that by the time the gases leave the relatively short inner chimney 23 they are sufficiently cool to be admitted into the metal chimney 6 without risking over-heating it.

In an actual installation such as that described, the hopper 4 has a capacity of 2,000 litre and the ram 12 has a cross-section of 110 × 65 cm and carries out loading of the oven 5 at a regular but adjustable rate. The combustion chamber 9 is in soft sheet-steel lined with refractory concrete having a high thermal resistance. The burners 13 can operate at two speeds, so as to bring the temperature of the oven to the indicated value 800° C and then supply, at this temperature, the necessary heat for the combustion of a material of very low heat value, such as household refuse. The conveyor 16 is actuated by a ½ H.P. motor and its speed can reach 10 m/h. The primary combustion air, i.e., for chamber 9, is supplied by a blower having an output of 10,000 m³/h driven by a 15 H.P. motor at 1,500 r.p.m. A blower and motor with the same characteristics are used to supply the secondary air (i.e., for chamber 18) and the air required for the cooling section 21.

An additional blower with an output of 5,000 m³/h and driven by a 4. H.P. motor at 1,500 r.p.m. can be provided for cooling the grid 10.

Experience has shown that with the described installation, the temperature in the combustion chamber 9 and in the post-combustion chamber 18 must be maintained at about 800° C. A lower temperature would be sufficient to ensure complete combustion and a much higher temperature would give no advantage and would consequently be uneconomical.

The described installation enables the smoke issuing from the chimney 6 to be transparent, odourless, dustless, and generally in conformity with the anti-pollution prescriptions in force.

Between the combustion chamber 9 and the post-combustion chamber 18, venturis can be mounted so as to obtain a total combustion of the gas and volatile particles.

What is claimed is:

1. In an installation for the incineration of household refuse and industrial waste, including an oven having therein a chamber for the combustion of refuse and waste, means for introducing liquid or gaseous fuel into said combustion chamber, thermostat means for maintaining the temperature of said combustion chamber at at least 800° C, a post-combustion chamber for burning gases received from said combustion chamber, and a chimney for evacuating burnt gases from said post-combustion chamber, the improvement comprising:

said oven having a substantially cylindrical exterior shape;
said combustion chamber comprising an upper part having a substantially elliptical transverse cross-sectional shape, and a lower recessed part;
a grid means positioned within said combustion chamber and separating said upper and lower parts thereof for receipt of said refuse and waste;
said combustion chamber having therein an outlet;
an ash conveyor means mounted in said lower part beneath said grid means for receipt of ashes therethrough and for conveying said ashes to said outlet;
air inlet means for supplying combustion air into said lower part and to pass said air upwardly through said grid means and said refuse and waste;
a panel of venturi filters positioned between said combustion chamber and said post-combustion chamber; and
a cooling section in said chimney for cooling said burnt gases received therein from said post-combustion chamber.

* * * * *